No. 674,549. Patented May 21, 1901.
F. R. WREN.
EARTH AUGER ATTACHMENT.
(Application filed Mar. 5, 1901.)

(No Model.)

Witnesses:
C. B. Butler
N. M. Nickerson

Inventor:
FRED R. WREN
By W. T. Miller
Attorney

UNITED STATES PATENT OFFICE.

FRED R. WREN, OF BUFFALO, NEW YORK, ASSIGNOR OF ONE-HALF TO GEORGE CLINTON AND WILLIAM T. MILLER, OF SAME PLACE.

EARTH-AUGER ATTACHMENT.

SPECIFICATION forming part of Letters Patent No. 674,549, dated May 21, 1901.

Application filed March 5, 1901. Serial No. 49,780. (No model.)

*To all whom it may concern:*

Be it known that I, FRED R. WREN, a citizen of the United States, residing at Buffalo, in the county of Erie and State of New York, have invented certain new and useful Improvements in Earth-Auger Attachments; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in earth-augers, and more particularly to certain attachments for facilitating their operation in the removal of earth for providing holes for the reception of fence-posts, telegraph and telephone poles, and the like. It is a well-known fact that holes of a limited diameter only can be bored by hand-power with the ordinary earth-auger now in general use, after which the hole is enlarged to the requisite diameter by the employment of a crowbar to loosen and pry away the earth around the sides of the hole and a spoon-shovel to remove the loosened earth from the hole, which proportionately increases the time and consequent expense required.

The object of my present invention is therefore to provide a novel and inexpensive attachment to the ordinary earth-auger by means of which the use of the crowbar and spoon-shovel is entirely dispensed with and the expense of digging the hole reduced to a minimum.

To that end my invention consists of a certain arrangement and combination of parts, which will be fully hereinafter described.

I will now minutely describe the manner in which I have carried out my invention and then claim what I believe to be novel.

Figure 1:
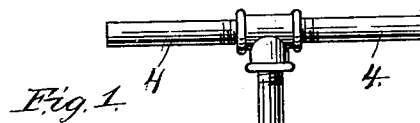
Figure 2:
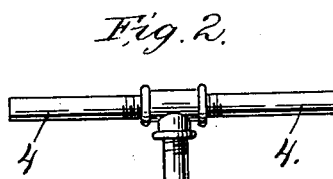
Figure 3:
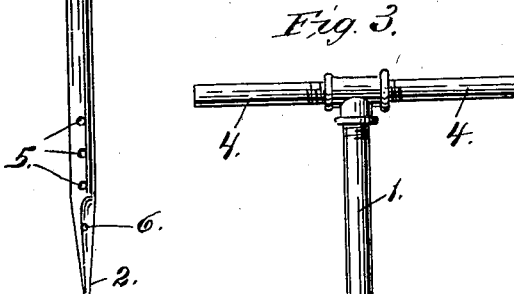
Figure 3:
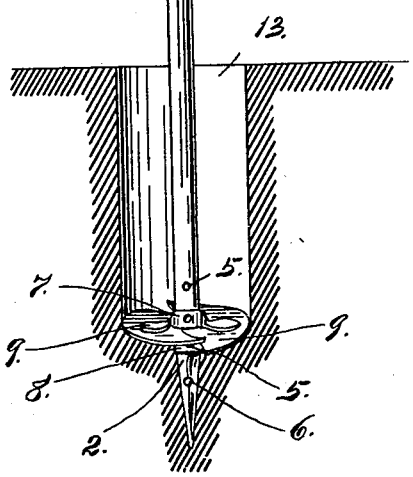
Figure 3:
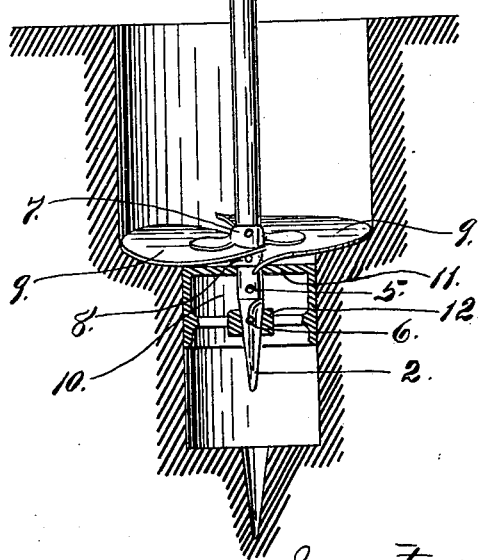

In the drawings, Figure 1 is an elevation of the handle and shank without the auger and guide. Fig. 2 is an elevation of the auger without the guide, illustrating the manner of cutting the initial hole; and Fig. 3 is an elevation of the auger, with the guide in section attached thereto, illustrating the cutting away of a section of earth concentric with the initial hole shown in Fig. 2.

Referring to the drawings, 1 is the metal shank, preferably of tubular form, having its lower end 2 drawn down to a point, as shown.

3 is an ordinary T-coupling, in which are engaged the upper end of the shank 1 and the inner ends of the handles 4 4.

In the lower end of the tubular shank 1 are the holes 5, preferably three in number, and in the pointed end 2 is the hole 6.

7 is the upper part, and 8 the lower part, of the socket of the auger, and 9 9 are its cutting-blades, of the well-known overlapping construction.

10 is the guide, preferably of cylindrical construction, with the closed or solid top 11 and central integral socket 12.

In operation the initial hole 13 is cut in the earth with the auger, removably secured by passing locking-pins through holes in the parts 7 and 8 of the auger-socket and through the two lower holes 5 in the shank 1, as clearly shown in Fig. 2. We will say, for example, that the initial hole 13 is ten inches in diameter. Now to enlarge this hole to one having a diameter of twenty inches it is only necessary to remove the ten-inch auger, replace it with a twenty-inch auger, which is removably secured in the two upper holes 5 5 of the shank, as shown in Fig. 3, and secure the guide 10 11 in position immediately below the auger by passing a locking-pin through holes in the socket 12 and through the hole 6 in the pointed end 2 of the shank 1. In turning the auger equipped as described the guide 10 11 enters the initial hole 13, and being of the same diameter has snug sliding contact therewith. As the auger is turned it cuts away a concentric section of earth five inches thick from around the ten-inch initial hole, descending in a true vertical line under the controlling action of the guide 10 11. The hole can be further increased in diameter by the substitution of a correspondingly larger auger and guide in the same manner as has just been described.

It will be seen from the foregoing description that a hole of any desired diameter can be bored by little or no increase in hand-power over that required in boring the initial hole, the loosened earth being as quickly and easily detached and lifted out of the hole with the attached guide as when boring the initial hole. Then, too, this improved operation has the additional advantage of doing away entirely with the crowbar and spoon-shovel, the slow and expensive use of which is rendered imperative with the ordinary earth-auger as at present employed. After the initial hole has been bored the loosening of each succeeding concentric section of earth with the use of a larger auger and my improved guide actually requires less hand-power than in boring the initial hole, and the time required in boring a hole with my improved device over the old way with crowbar and spoon-shovel is materially diminished, thus effecting a corresponding decrease in the expense of operation.

I claim—

In an earth-auger, the combination with the handle, the shank provided with a series of holes in its lower end, and the cutting-auger adapted for removable and adjustable engagement with the shank, of the guide, of smaller diameter than the cutting-auger and provided with a solid top and central socket and adapted for removable engagement with the shank, below the cutting-auger, substantially as and for the purpose stated.

In testimony whereof I have signed my name to this specification in the presence of two subscribing witnesses.

FRED R. WREN.

Witnesses:
O. E. HODDICK,
C. S. JOHNSON.